Patented Aug. 12, 1947

2,425,572

UNITED STATES PATENT OFFICE 2,425,572

ALKYLATION

Ober C. Slotterbeck, Rahway, N. J., assignor to Standard Oil Development Company, a corporation of Delaware No Drawing. Application March 28, 1942, Serial No. 436,613

4 Claims. (Cl. 260—683.4)

This invention relates to a process of alkylating isoparaffins with olefins in the presence of concentrated sulfuric acid as the catalyst with a sulfonic acid utilized as an effective promoter for the reaction.

It is known that isoparaffins are alkylated with olefins in the presence of concentrated sulfuric acid at low temperatures of about 0° C. to 30° C. Concentrated sulfuric acid is known to be one of the most practical catalysts for this reaction and to give desired good yields of high octane number gasoline hydrocarbons when it is maintained relatively pure.

The alkylation in the presence of the sulfuric acid is complicated and is accompanied by side reactions which often tend to foul the catalyst. Therefore, ways of controlling the reaction are of practical importance. It has been noted that in starting the reaction, the olefin and isoparaffin reactants may be added to the sulfuric acid for a period of time without the desired alkylation reaction proceeding, and in this induction or delay period, the sulfuric acid may be given time to attack the olefins and thereby form the undesired byproducts.

In accordance with the present invention, it has now been found that an addition of a sulfonic acid in a minor proportion to the sulfuric acid catalyst improves the alkylation in several respects. The sulfonic acid promoter materially increases the yields of the alkylation product, reduces the amount of unsaturated byproduct, and further permits the reaction to be carried out more selectively over a wider range of temperatures.

A preferred promoter for the present purposes is chlorosulfonic acid, but other substituted sulfonic acids, preferably the aliphatic sulfonic acids, are useful in this connection. In using any of the substituted sulfonic acids, it has been found well to keep in mind that it is desirable to avoid diluting the sulfuric acid catalysts excessively, since with the diminution of the titratable acidity, the yields tend to be adversely affected, and moreover, too great a loss is sustained in the regeneration of the catalyst. In employing the chlorosulfonic acid as the promoter, it is also important to keep its concentration limited, because this acid has a tendency in excessively high concentrations to decompose the isoparaffins on account of its high reactivity, especially at temperatures above 0° C.

The alkylation reaction may be carried out in any suitable form of apparatus and with a variety of isoparaffins and olefins, such as are capable of entering into the low temperature alkylation reaction with concentrated sulfuric acid, e. g., isobutane with normal butenes, isopentane with isobutylene, or normal butenes, etc. As in the usual procedure, the ratio of isoparaffins to olefins is at least about 1:1, and the titratable acidity of the catalyst is maintained in the reaction mixture above 85%, and preferably from about 90% to 98%. The pressure is maintained conveniently at about atmospheric or somewhat higher. The reaction mixture is agitated in a closed reactor, and with the promoter present, the reaction proceeds very promptly and smoothly. In a continuous operation, the promoter can thus improve the reaction by shortening the time of treatment.

To illustrate the invention, the following examples are presented:

EXAMPLE 1

For a blank run, 145 g. of 96% $H_2SO_4$ with 116 g. of isopentane and 29 g. of di-isobutylene were subjected to reaction in a 3 necked flask with mechanical stirring for a period of 40 minutes. The same reaction was run in a comparative manner with 3% of added chlorosulfonic acid. On comparing the products, it was observed that the yield was materially increased and that the product contained a substantially lower amount of unsaturated by-products with the small amount of chlorosulfonic acid present. A detailed summary of the operation and results are shown in the following table:

TABLE I

Effect of addition of chlorosulfonic acid to sulfuric acid alkylation catalyst (DIMER-ISOPENTANE ALKYLATION AT ROOM TEMPERATURE)

| Charge: | | |
|---|---|---|
| i-$C_5H_{12}$, g | 116 | 116 |
| Diisobutylene, g | 29 | 29 |
| 96% $H_2SO_4$, g | 145 | 145 |
| Addition agent, g | 0 | 5 |
| Addition agent | None | $ClSO_3H$ |
| Total contact time, min | 40 | 40 |
| Recovery: | | |
| i-$C_5H_{12}$, g | 78.1 | 70 |
| Acid, g | 147 | 152.5 |
| Product, g | 54.9 | 62.9 |
| Product yield, based on dimer charged, wt. percent | 189 | 217 |
| Average bromine number of product | 2.5 | 1.3 |

EXAMPLE 2

Using the same conditions, concentrations of reactants, and catalysts as described in Example 1, 5 g. of benzene sulfonic acid were added to the sulfuric acid before the beginning of the reaction. The yield of the alkylation product was increased to 221% in one run and 222% in a second run, based on the olefin charge in using the benzene sulfonic acid promoter.

EXAMPLE 3

Using the same conditions, concentration of reactants, and catalysts as described in Example 1 with 5 g. of amyl sulfonic acid added to the sulfuric acid catalyst before the start of the reaction, the yield of alkylate was increased to 223.8%.

In using the sulfonic acid promoters as described in proper proportions, preferably in amounts of about 1% to 10% by weight of the sulfuric acid catalyst, the increased alkylate yields were obtained without any discoloration of the product.

A mixture of the sulfonic acid promoters may be used in the catalyst as, for example, an aliphatic sulfonic acid together with an inorganic sulfonic acid. Other promoting agents as, for example, metal salts, hydrogen halide, acids, and the like, of known effectiveness, may be employed together with the preferred sulfonic acid promoters herein described.

It is not intended that the invention be limited by the specific examples given for the purpose of illustration, or by any theory on the mechanism of the promoting effect. Modifications which come within the spirit of the invention are intended to be included within the scope thereof.

I claim:

1. In a process of alkylating isoparaffins with iso-olefins in the presence of a concentrated sulfuric acid catalyst, incorporating into the catalyst before the start of the reaction from about 1% and 10% by weight of chlorosulfonic acid.

2. In a process of alkylating isoparaffins with olefins using a concentrated sulfuric acid catalyst, the improvement which comprises maintaining in the sulfuric acid catalyst a minor amount of chlorosulfonic acid sufficient to promote the reaction.

3. In a process of alkylating an isoparaffin with an olefin using a sulfuric acid as a catalyst, the improvement which comprises carrying out the alkylation at a temperature in the range of 0° C. to about 30° C. with sulfuric acid present in sufficient amount to give a titratable acidity of from 85% to about 98%, and with from 1% to 10% of chlorosulfonic acid admixed to promote the reaction.

4. A process of alkylating isopentane with isobutylene, which comprises reacting the isopentane with isobutylene in the presence of sulfuric acid having a titratable acidity of from about 90% to 98% at a temperature above 0° C. and with from about 1% to 10% of chlorsulfonic acid based on the weight of the sulfuric acid to promote the reaction.

OBER C. SLOTTERBECK.

REFERENCES CITED

The following references are of record in the file of this patent:

UNITED STATES PATENTS

| Number | Name | Date |
|---|---|---|
| 2,286,504 | Parker | June 16, 1942 |
| 2,286,183 | Bradley et al. | June 16, 1942 |
| 2,282,505 | Vesterdal | May 12, 1942 |
| 2,259,723 | Ballard et al. | Oct. 21, 1941 |
| 2,255,610 | Bradley | Sept. 9, 1941 |

FOREIGN PATENTS

| Number | Country | Date |
|---|---|---|
| 379,353 | Italy | Mar. 25, 1940 |